April 7, 1970     A. V. KISOVEC     3,504,989

ROTOR SYSTEM

Filed Dec. 28, 1967     2 Sheets-Sheet 1

INVENTOR
*ADRIAN V. KISOVEC*

BY *Matthew P. Lynch*

ATTORNEY

INVENTOR
ADRIAN V. KISOVEC
BY Matthew P. Lynch
ATTORNEY

United States Patent Office
3,504,989
Patented Apr. 7, 1970

3,504,989
ROTOR SYSTEM
Adrian V. Kisovec, Morton, Pa., assignor to The Boeing Company, Seattle, Wash., a corporation of Delaware
Filed Dec. 28, 1967, Ser. No. 694,175
Int. Cl. B64c 11/06
U.S. Cl. 416—114                        22 Claims

ABSTRACT OF THE DISCLOSURE

Collective pitch effected by concurrent movement of first and second swashplate assemblies whereby a blade and its mounting assembly are rotated through equal pitch angles while cyclic pitch is achieved by movement of one swashplate and the blade alone.

BACKGROUND OF THE INVENTION

In a chain link configuration of blade attachment, which is typical for the elastomeric mount variant, the necessary clearance between the hub lugs or clevises and the blade yoke presents a problem. In order to accommodate large combined blade deflections in pitch, flapping and lead-lag, the hubs become very bulky and increase drag. Also, excessive strain is introduced in the elastomeric blade mounts due to the combined stresses caused by the collective and cyclic pitch being introduced upon each other.

The present invention is a variant of the inventor's U.S. Patent 3,282,350 construction.

SUMMARY OF THE INVENTION

The present invention enables the reduction of the design envelope for a blade mounting assembly with corresponding reduction of hub drag. More particularly, the present invention enables a blade that is connected to a hub by an elastomeric mount to have its collective pitch changed without straining the elastomeric mount.

These results are achieved by eliminating the normal elastomeric bearing mount deflection caused by collective pitch and providing the collective pitch through pivotal blade mounts. Thus, the elastomeric mount deflects only in cyclic pitch (on top of flapping and lead-lag) and the necessary clearance between the blade mount and the blade yoke is considerably reduced. Moreover, since the elastomeric mount is not deflected in collective pitch its strain is substantially reduced, thus enabling an overall reduction of the bearing size and an increase in its useful life.

The present invention in its broadest sense consists of a rotor shaft terminating in a hub to which a blade mounting system is rotatably secured and mechanism for concurrently rotating the blade and its mounting system about the blade pitch axis to change the collective pitch of the rotor system while rotating the blade about its pitch axis independently of the blade mounting system to vary the cyclic pitch of the blade.

DESCRIPTION OF THE DRAWINGS

FIG. 4 is a sectional view illustrating the connection of one of the lower actuators to the inner race of the lower swashplate.

DESCRIPTION OF THE PREFERRED EMBODIMENTS

Figure 1:
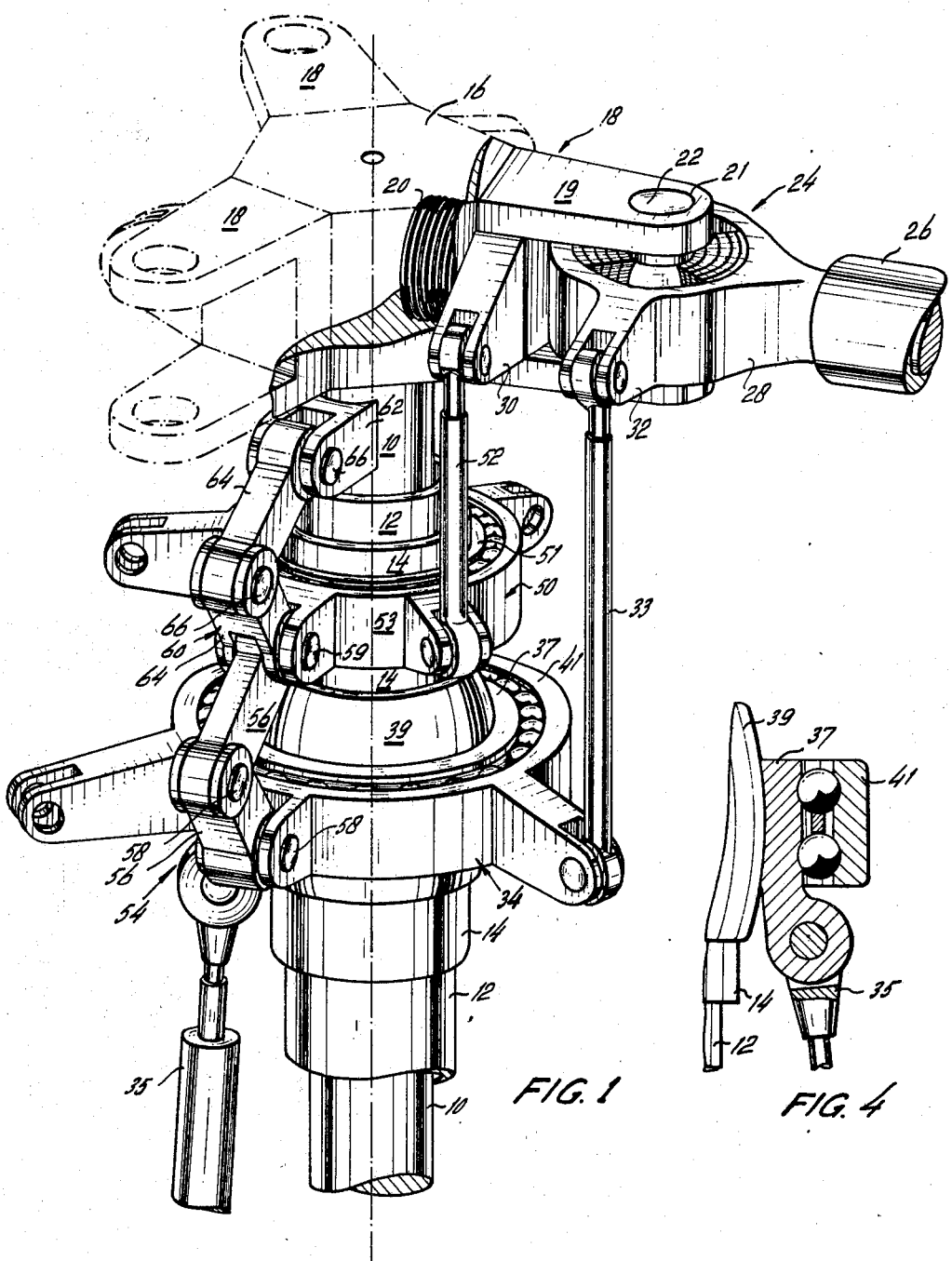
FIG. 1 is a perspective view illustrating the rotor system of the present invention, including the first and second swashplates and their linkage to blade yokes and hub lugs or clevises.

In FIG. 1, the reference numeral 10 designates a shaft while reference numeral 12 designates a stack disposed about the shaft. A collective pitch sleeve 14 is mounted about the stack 12 in sliding relationship thereto.

Shaft 10 terminates upwardly in hub 16, illustrated substantially in phantom, within which blade mounting assemblies are rotatably mounted. In the preferred embodiment each blade mounting assembly 18 consists of a hub lug or clevis 19. Each clevis 19 terminates at one end in a threaded shank 20 which enables the hub clevis 19 to be screwed into the hub body 16 while permitting rotation of the clevis 19 with respect to the hub body 16, as described in detail hereinafter. The hub clevis 19 is provided at the other end with openings 21 within which the pin 22 of double spherical elastomeric mount assembly 24 is positioned. Each blade shank 26 terminates inwardly in yoke 28 movably mounted within its respective hub clevis by elastomeric mount assembly 24. Finally, hub clevis 19 includes pitch arm 30 while blade yoke 28 is provided with pitch arm 32.

For a more detailed description of assembly 24, attention is directed to the inventor's U.S. Patent 3,282,350, incorporated herein by specific reference. For purposes of disclosing the present invention and with reference to FIG. 2 it will suffice to say that each blade yoke 28 is connected to its respective hub clevis 19 through pin 22. Intermediate the ends of pin 22 is located an arcuate, preferably spherical, portion 23 while the blade yoke 28 is provided with an arcuate, preferably spherical, complementary surface (see FIGURE 2) 29. An elastomer bearing 31 is disposed between surface 29 and portion 23 and is formed of a plurality of interleaved metal and elastomeric layers. The elastomeric bearing 31 is bonded to both the portion 23 and surface 29 of the yoke 28.

A first swashplate means 34 is operatively connected to pitch arm 32 of blade yoke 28 through a conventional pitch link 33. In conventional manner, swashplate means 34 is vertically displaceable and tiltable by lower actuators 35 (only one of which is illustrated schematically for purposes of disclosing the present invention).

It will be noted, as seen in FIGURE 4, that the lower actuators 35 are connected to the inner race 37 of the swashplate means 34. The inner race 37 is disposed about a sphere 39 which in turn is fixedly secured to the sleeve 14. During collective pitch changes the entire swashplate and sphere assembly will move as a unit with the sliding sleeve 14. For cyclic pitch changes the inner and outer races of the swashplate will move relative to and about the sphere 39 since the outer surface of the sphere and the inner surface of the inner race 37 have complementary arcuate surfaces. During normal flight, the outer race 41 of the swashplate assembly 34 rotates with the hub 16; however, the inner race 37 remains stationary until cyclic pitch is imposed.

A second swashplate means, designated generally by reference numeral 50, is mounted on sleeve 14 above the first swashplate means 34 and includes an inner race 51 and an outer race 53. The inner race 51 is fixedly connected to the sleeve 14, so that the entire swashplate means 50 will move vertically with the sleeve 14 during collective pitch changes while allowing the outer race 53 to rotate with the hub 16. The second swashplate 50, however, unlike swashplate means 34 is not affected by cyclic pitch changes and thus has substantially the construction of an anti-friction bearing with a rotatable outer race. The outer race 53 of the swashplate means 50 is operatively connected to pitch arm 30 through pitch link 52.

A lower scissors assembly 54 connects the outer races of the first and second swashplate means 34 and 50 and consists of arms 56 pivotable about pins 58 and 59. In similar manner, upper scissors assembly 60 connects the outer race 53 of the second swashplate means 50 and an ear 62 on the shaft 10 and consists of arms 64 pivotable about pins 59 and 66.

As will be apparent, when collective control is introduced by sliding the sleeve 14, pitch links 33 and 52 move in unison, link 33 rotating yoke 28 and its associated blade and link 52 rotating hub clevis 19. Thus, there is no relative pitch motion between the blade and its mounting assembly 18, i.e., the blade yoke 28 does not move relative to the elastomeric mount assembly 24 or clevis 19. Cyclic pitch is achieved by tilting the first swashplate means 34 about the sphere 39 in a conventional manner whereby the elastomeric bearing 31 is deflected and the blade yoke 28 is rotated about the blade pitch axis.

In summary, means are provided for rotating the blade mounting means 18 and the blade in unison about the pitch axis of the blade for collective pitch changes. For cyclic pitch changes a separate system, such as swashplate means 34, rotates the blade independently of the blade mounting means 18 about its pitch axis.

Figure 2:
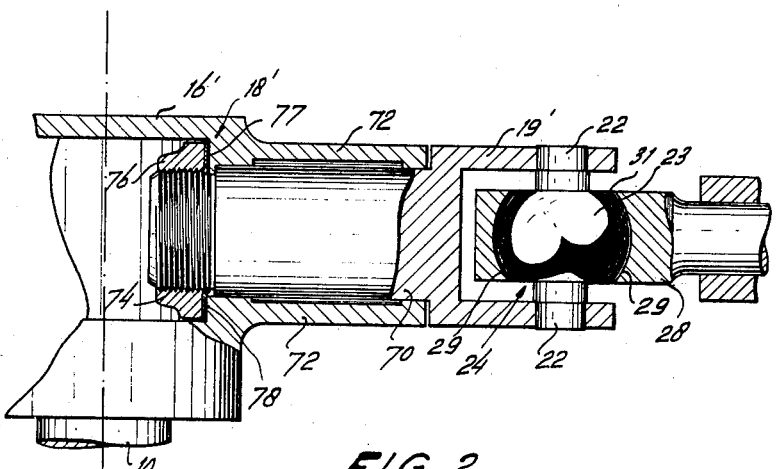
FIG. 2 is a sectional view illustrating a second embodiment of the hub clevis installation featuring a nut and thrust washer construction.

FIG. 2 illustrates a variant of the clevis installation wherein hub clevis 19' includes a shank 70 which extends within walls 72 of hub 16' and terminates in threaded portion 74 secured within hub 16' by nut 76 and thrust washer 77 which abuts seat or bearing surface 78. As a substitute for washer 77, a cylindrical elastomeric thrust bearing may be employed.

Figure 3:
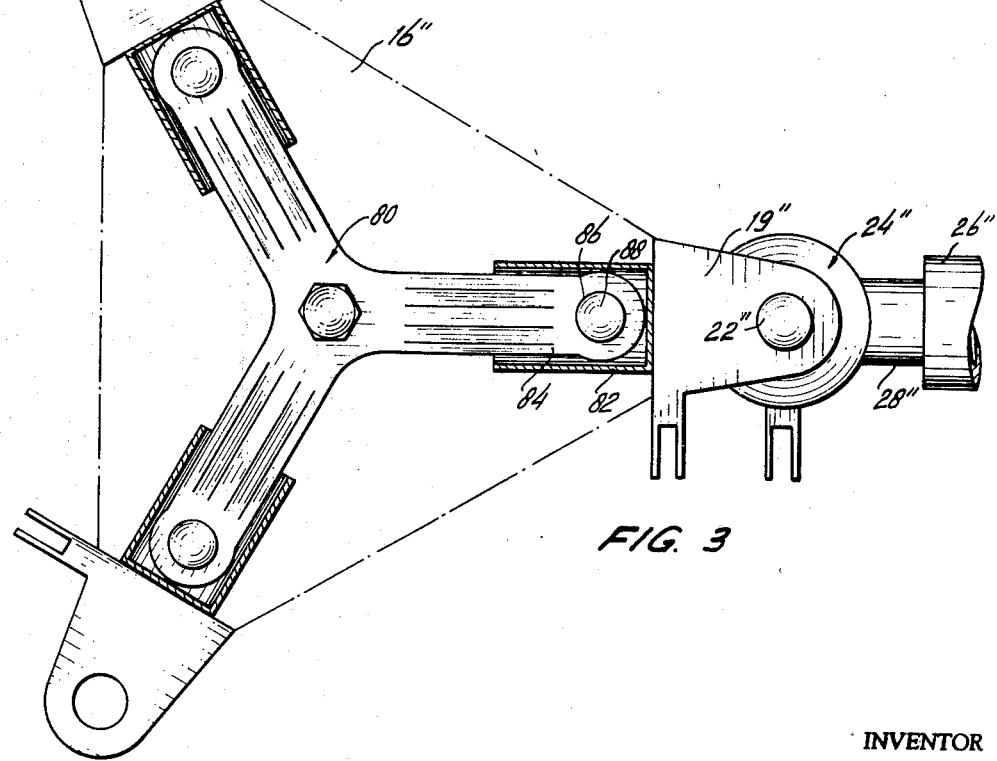
FIG. 3 is a sectional plan view illustrating a third embodiment of the hub clevis retention system featuring a torsion-tension strap.

FIG. 3 illustrates another variant of clevis retention wherein a three-legged torsion-tension strap, generally designated by reference numeral 80, is mounted within hub body 16''. In this embodiment, each hub clevis 19'' terminates in a hollow shank 82 within which is mounted the terminal of leg 84 of strap 80. Within leg 84 is located opening 86 through which pin 88 passes which, in turn, is secured to the top and bottom of shank 82.

It is considered within the scope of the present invention to provide a desired relative pitching motion between the blade mounting means 18 and the blade by corresponding kinematics of the two pitch control systems.

While a preferred embodiment has been illustrated and described in detail, it will be obvious to those skilled in the art that modifications and substitutions can be made in the construction and rotational attachment of the blade mounting means or the means for imposing collective and cyclic pitch on the blade or in other apparatus herein without departing from the spirit and scope of this invention. This invention serves a valuable and necessary purpose in providing for the concurrent movement of an elastomer blade mount and a blade in collective pitch so that the mount is not stressed or deflected by collective pitch. Additionally, only the blade is rotated for the imposition of cyclic pitch whereby the mount is only deflected a limited amount because one pitch motion is not imposed upon another. A means consisting of two swashplates which can operate in unison or independently, causes the imposition of the collective and cyclic pitch.

What I claim is:
1. A rotor system, comprising:
   (A) a rotatable shaft;
   (B) a hub secured to said shaft for rotation therewith;
   (C) a blade having a pitch axis;
   (D) blade mounting means rotatably secured to said hub;
   (E) means resiliently mounting said blade to said mounting means for movement about the pitch axis of said blade;
   (F) means for concurrently rotating said blade and said blade mounting means about the pitch axis of said blade to change the collective pitch of the rotor system; and
   (G) means for rotating said blade about its pitch axis independently of said blade mounting means to vary the cyclic pitch of said blade and for selectively holding said blade mounting means against movement resulting from changes in cyclic pitch of said blade.

2. A rotor system in accordance with claim 1, wherein said means changing collective pitch includes:
   (F1) a sleeve slidably disposed about said shaft;
   (F2) means operatively connecting said blade mounting means and said blade to said sleeve; and
   (F3) means for moving said sleeve along the longitudinal axis of said shaft, whereby said blade mounting means and said blade are rotated in unison about the pitch axis of said blade.

3. A rotor system in accordance with claim 2 wherein said means varying the cyclic pitch of said blade includes:
   (G1) a sphere disposed about said shaft;
   (G2) a swashplate disposed about said sphere;
   (G3) a pitch link connecting said swashplate to said blade; and
   (G4) means for tilting said swashplate about said sphere whereby said pitch link is raised and lowered rotating said blade about its pitch axis.

4. A rotor system in accordance with claim 3, wherein said swashplate includes a bearing having an inner race with an arcuate surface complementary to said sphere and in encircling juxtaposition thereto and an outer race, said tilting means being connected to said inner race and said pitch link being connected to said outer race.

5. A motor system in accordance with claim 2, wherein said means operatively connecting said blade mounting means and said blade to said sleeve includes:
   (F2A) a first swashplate secured about said sleeve;
   (F2B) a pitch link connecting said first swashplate to said blade;
   (F2C) a second swashplate secured about said sleeve; and
   (F2D) a pitch link connecting said second swashplate to said blade mounting means.

6. A rotor system in accordance with claim 1, wherein said blade mounting means includes a clevis, an elastomeric bearing and means mounting said bearing within said clevis.

7. A rotor system in accordance with claim 6, wherein said blade terminates in a yoke disposed about and secured to said elastomeric bearing.

8. A rotor system in accordance with claim 7, wherein said elastomeric bearing is a double spherical bearing.

9. A rotor system, comprising:
   (A) a rotatable shaft;
   (B) a hub secured to said shaft for rotation therewith;
   (C) a blade;
   (D) blade mounting means rotatably secured to said hub;
   (E) an elastomeric bearing connecting said blade to said mounting means;
   (F) means for rotating said blade, mounting means and elastomeric bearing in unison about the pitch axis of said blade changing the collective pitch of the rotor system while said elastomeric bearing remains stationary with respect to said blade and mounting means; and
   (G) means for rotating said blade about said elastomeric bearing such that said blade is rotated about its pitch axis independently of said mounting means varying the cyclic pitch of said blade.

10. A rotor system in accordance with claim 9, wherein said means changing collective pitch includes:
   (F1) a sleeve slidably disposed about said shaft;
   (F2) means operatively connecting said blade mounting means and said blade to said sleeve; and
   (F3) means for moving said sleeve along the longitudinal axis of said shaft, whereby said blade mounting means and said blade are rotated in unison about the pitch axis of said blade.

11. A rotor system in accordance with claim 9, wherein said means varying the cyclic pitch of said blade includes:
 (G1) a sphere disposed about said shaft;
 (G2) a swashplate disposed about said sphere;
 (G3) a pitch link connecting said swashplate to said blade; and
 (G4) means for tilting said swashplate about said sphere whereby said pitch link is raised and lowered rotating said blade about its pitch axis.

12. A rotor system in accordance with claim 9, wherein said swashplate includes a bearing having an inner race with an arcuate surface complementary to said sphere and in encircling juxtaposition thereto and an outer race, said tilting means being connected to said inner race and said pitch link being connected to said outer race.

13. A rotor system in accordance with claim 10, wherein said means operatively connecting said blade mounting means and said blade to said sleeve includes:
 (F2A) a first swashplate secured about said sleeve;
 (F2B) a pitch link connecting said first swashplate to said blade;
 (F2C) a second swashplate secured about said sleeve; and
 (F2D) a pitch link connecting said second swashplate to said blade mounting means.

14. A rotor system in accordance with claim 9, wherein said blade mounting means includes a clevis having ends, said elastomeric bearing secured between said ends of said clevis.

15. A rotor system in accordance with claim 14, wherein said blade includes a yoke disposed about and secured to said elastomeric bearing.

16. A rotor system in accordance with claim 15, wherein said elastomeric bearing is a double spherical bearing.

17. A rotor system, comprising:
 (A) a rotatable shaft;
 (B) a hub mounted on said shaft and adapted to rotate therewith;
 (C) a blade;
 (D) a blade mounting means rotatably attached to said hub;
 (E) an elastomeric bearing resiliently mounting said blade to said mounting means;
 (F) a first swashplate operatively connected to said blade;
 (G) a second swashplate operatively connected to said blade mounting means;
 (H) means for moving said first and said second swashplates concurrently to rotate said blade mounting means and said blade about the pitch axis of said blade relative to said hub; and
 (I) means for moving said first swashplate independently of said second swashplate to rotate said blade on said elastomeric bearing about its pitch axis independently of said blade mounting means.

18. A rotor system, comprising:
 (A) a rotatable shaft;
 (B) a hub mounted on said shaft and terminating in a clevis, together with means mounting said clevis for rotation with respect to said hub;
 (C) a bearing mounted within said clevis;
 (D) a blade having a pitch axis and including a yoke mounted to said bearing for rotation about said pitch axis;
 (E) a first swashplate assembly mounted on said shaft, together with means operatively connecting same to said blade yoke for imparting rotation to said blade about its pitch axis;
 (F) a second swashplate assembly mounted on said shaft, together with means operatively connecting same to said hub clevis for imparting rotation to said clevis;
 (G) means for actuating said first and second swashplate assemblies to introduce collective pitch control whereby said first and second swashplate assemblies move said clevis and blade yoke in unison and for selectively holding said second swashplate assembly against movement resulting from changes in cyclic pitch of said blade while actuating said first swashplate assembly to introduce cyclic pitch control by rotating said blade yoke about said bearing within said hub clevis.

19. A rotor system as in claim 18, wherein said bearing is characterized as being elastomeric.

20. A rotor system as in claim 18, wherein said means mounting said clevis for rotation with respect to said hub includes a shank portion of said clevis secured to a thrust washer abutting a surface of said hub.

21. A rotor system as in claim 18, wherein said means mounting said clevis for rotation with respect to said hub includes a torsion-tension strap secured at one end to said hub clevis, together with means resiliently anchoring the other end thereof.

22. In a rotor system having a shaft terminating in a hub provided with lugs within which blade yokes are mounted for movement, the combination therewith of a system for introducing collective and cyclic pitch control, including first and second swashplate assemblies, means mounting said swashplate assemblies operatively such that as the first and second swashplate assemblies move vertically along the shaft the hub lugs and blade yokes moves in unison and means for actuating the first swashplate assembly to control the pitch of the blade yokes while holding the second swashplate against movement resulting from changes in cyclic pitch of said blade.

References Cited

UNITED STATES PATENTS

| | | | |
|---|---|---|---|
| 1,919,586 | 7/1933 | Dodge | 170—160.51 |
| 2,818,123 | 12/1957 | Hiller | 170—160.25 |
| 3,213,944 | 10/1965 | Nichols et al. | 170—160.26 XR |
| 3,282,350 | 11/1966 | Kisovec | 170—160.53 XR |

LAURENCE M. GOODRIDGE, Primary Examiner

U.S. Cl. X.R.

416—135, 141